United States Patent
Salgian et al.

(12) 
(10) Patent No.: US 8,744,122 B2
(45) Date of Patent: Jun. 3, 2014

(54) SYSTEM AND METHOD FOR OBJECT DETECTION FROM A MOVING PLATFORM

(75) Inventors: Garbis Salgian, Princeton, NJ (US); John Benjamin Southall, Philadelphia, PA (US); Sang-Hack Jung, Princeton, NJ (US); Vlad Branzoi, Princeton, NJ (US); Jiangjian Xiao, Plainsboro, NJ (US); Feng Han, Princeton, NJ (US); Supun Samarasekera, Montgomery, NJ (US); Rakesh Kumar, West Windsor, NJ (US); Jayan Eledath, Princeton, NJ (US)

(73) Assignee: SRI International, Menlo Park, CA (US)

( * ) Notice: Subject to any disclaimer, the term of this patent is extended or adjusted under 35 U.S.C. 154(b) by 1181 days.

(21) Appl. No.: 12/604,298

(22) Filed: Oct. 22, 2009

(65) Prior Publication Data

US 2010/0202657 A1    Aug. 12, 2010

Related U.S. Application Data

(60) Provisional application No. 61/107,543, filed on Oct. 22, 2008.

(51) Int. Cl.
*G06K 9/00* (2006.01)

(52) U.S. Cl.
USPC .......................................... 382/103; 382/100

(58) Field of Classification Search
None
See application file for complete search history.

(56) References Cited

U.S. PATENT DOCUMENTS

| | | | | | |
|---|---|---|---|---|---|
| 5,528,703 | A | * | 6/1996 | Lee | 382/257 |
| 5,537,511 | A | * | 7/1996 | DeAngelis et al. | 706/24 |
| 5,963,653 | A | * | 10/1999 | McNary et al. | 382/103 |
| 6,608,910 | B1 | * | 8/2003 | Srinivasa et al. | 382/100 |
| 6,956,469 | B2 | | 10/2005 | Hirvonen et al. | |
| 7,035,764 | B2 | * | 4/2006 | Rui et al. | 702/179 |
| 7,085,401 | B2 | * | 8/2006 | Averbuch et al. | 382/103 |
| 7,263,209 | B2 | | 8/2007 | Camus et al. | |
| 7,729,510 | B2 | * | 6/2010 | Zakrzewski et al. | 382/100 |
| 7,796,029 | B2 | * | 9/2010 | Ma et al. | 340/539.25 |
| 8,041,139 | B2 | * | 10/2011 | Ma | 382/254 |
| 8,437,556 | B1 | * | 5/2013 | Saisan | 382/224 |
| 2004/0061777 | A1 | * | 4/2004 | Sadok | 348/83 |
| 2005/0131646 | A1 | * | 6/2005 | Camus | 701/301 |
| 2006/0170769 | A1 | * | 8/2006 | Zhou | 348/143 |
| 2007/0076917 | A1 | * | 4/2007 | Chen et al. | 382/103 |
| 2007/0110292 | A1 | * | 5/2007 | Bi et al. | 382/128 |
| 2007/0237387 | A1 | * | 10/2007 | Avidan et al. | 382/159 |
| 2007/0269107 | A1 | * | 11/2007 | Iwai et al. | 382/168 |

(Continued)

OTHER PUBLICATIONS

Ince et al ("Principles of Integrated Maritime Surveillance Systems", chapter 7, 2000).*

(Continued)

*Primary Examiner* — Jason M Repko
*Assistant Examiner* — Avinash J Yentrapati
(74) *Attorney, Agent, or Firm* — Moser Taboada

(57) ABSTRACT

The present invention relates to a system and method for detecting one or more targets belonging to a first class (e.g., moving and/or stationary people), from a moving platform in a 3D-rich environment. The framework described here is implemented using a number of monocular or stereo cameras distributed around the vehicle to provide 360 degrees coverage. Furthermore, the framework described here utilizes numerous filters to reduce the number of false positive identifications of the targets.

21 Claims, 5 Drawing Sheets

(56) References Cited

U.S. PATENT DOCUMENTS

| | | |
|---|---|---|
| 2007/0273696 A1 | 11/2007 | Cheng et al. |
| 2008/0025568 A1* | 1/2008 | Han et al. ............... 382/103 |
| 2008/0089556 A1* | 4/2008 | Salgian et al. ........... 382/103 |
| 2008/0159620 A1 | 7/2008 | Camus et al. |
| 2008/0162389 A1* | 7/2008 | Aboutalib ................ 706/15 |
| 2008/0317314 A1* | 12/2008 | Schwartz et al. ......... 382/131 |
| 2010/0008539 A1* | 1/2010 | Johnson ................... 382/103 |
| 2010/0008540 A1* | 1/2010 | Shet et al. ............... 382/103 |
| 2010/0080469 A1* | 4/2010 | Liu et al. ................. 382/201 |
| 2010/0091330 A1* | 4/2010 | Marchesotti et al. ...... 358/1.18 |
| 2010/0322476 A1* | 12/2010 | Kanhere et al. .......... 382/103 |
| 2011/0103648 A1* | 5/2011 | Wiedemann et al. ...... 382/103 |

OTHER PUBLICATIONS

Toya et al ("Pedestrian Recognition using stereo vision and histogram oriented gradients", Sep. 2008).*

Broggi ("Stereo Vision-based approaches for Pedestrian Detection", 2005).*

\* cited by examiner

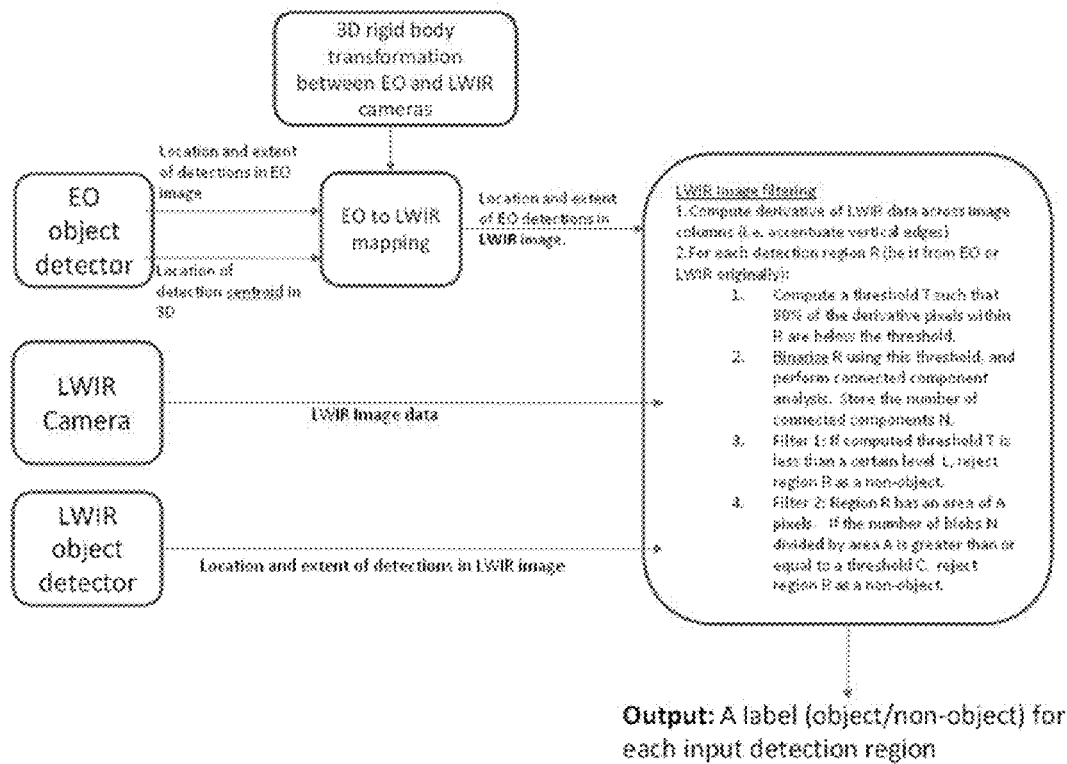

510 REFERENCE ART    520    530    540

Contour-based part vocabulary

SYSTEM AND METHOD FOR OBJECT DETECTION FROM A MOVING PLATFORM

CROSS-REFERENCE TO RELATED APPLICATIONS

This application claims the benefit of U.S. Provisional Patent Application No. 61/107,543, filed Oct. 22, 2008, titled "Framework for Object Detection from a Moving Platform," which is herein incorporated by reference.

GOVERNMENT RIGHTS IN THIS INVENTION

This invention was made with U.S. Government support under contract number DAAB07-01-D-G601. The U.S. Government has certain rights in this invention.

FIELD OF THE INVENTION

The present invention relates generally to the detection of objects in a camera's field of view. More specifically, the framework described herein relates to the detection of objects or targets from a moving platform in a 3D-rich environment.

BACKGROUND OF THE INVENTION

Significant interest exists in systems integrated into or onto a mobile platform (e.g., a vehicle) that can detect objects and utilize the object-detection information to properly classify and identify the detected objects. Prior art systems are configured to detect such potential objects; however, said systems are not able to classify the detected objects without returning a large number of false positives, leading to inefficiencies and an increased computational burden. False positives occur when a system improperly classifies a detected object as belonging to a particular category of objects the system is intended to identify.

One way these systems have attempted to lower the false positive rate is by utilizing filters. Some examples of filters include long wave infrared (LWIR) filtering and filters based on classifiers, e.g., AdaBoost or Support Vector Machine (SVM) classifiers with scale and/or rotation invariant feature descriptors (like histogram of oriented gradients (HOG) or Scale Invariant Feature Transform (SIFT).

Each type of filtering has its advantages and disadvantages. LWIR filtering may be easy to compute, however it has a high rate of false positives. Conventional classifiers that use HOG feature descriptors have a lower rate of false positives compared to LWIR filtering; however, it requires significant computational resources and can produce false negatives (i.e., a false negative occurs when a filter removes a candidate region, identified by a detector, that contains an object) when objects appear against complex and highly textured backgrounds because image gradient-based features become fragile in the presence of multiple gradient directions in a local image patch.

Furthermore, in general object detection and filtering, it is often required to search for an optimal region of interest (ROI) size and position to obtain valid classification scores. This is due to the sensitivity of the classifiers to ROI alignment as rigid placement of the local feature sampling windows inside the ROI become susceptible to different object configuration changes, such as different body poses in the case of pedestrian detection. This results in the need for an exhaustive search over multiple positions and scales for each input ROI.

Therefore, there is need in the art for a method and system that provides for efficient object detection and classification with a low false positive rate.

SUMMARY OF THE INVENTION

According to an embodiment of the present invention, systems and methods are provided for detecting moving and stationary objects of a certain class (e.g., people) from a moving or mobile platform in the presence of strong parallax, such as, for example, in the case of a ground vehicle or robot moving through an urban environment.

According to an embodiment of the present invention, the systems and methods use input from sensors of different modalities with a common field of view (e.g., visible, image intensifier, thermal, radar and time-of-flight sensors such as LADAR).

According to an embodiment of the present invention, multiple sensor sets may be distributed around a moving platform to provide 360 degree situational awareness.

According to an embodiment of the present invention, a plurality of detectors and filters are utilized to reduce the number of false positive detections (i.e., reduce the false positive rate).

According to an embodiment of the present invention, the combination of detectors and filters includes using an AdaBoost or SVM classifier that uses features derived from a combination of contour-based matching and HoG feature descriptor.

According to an embodiment of the present invention, the system and methods include first applying a LWIR filter in order to weed out or eliminate obvious false positives; then applying a filter of a second type to further identify and remove false positives from the detected region(s).

According to an embodiment of the present invention, systems and methods are provided for inferring behavior or type of activity of a detected object by tracking the object for a short time interval. This inferred activity can be used both to confirm object detection and to identify interesting, suspicious or threatening behaviors.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical or exemplary embodiments of this invention and are therefore not to be considered limiting of its scope, for the invention may admit to other equally effective embodiments.

FIG. 3 depicts an exemplary method including the application of a long wave infrared (LWIR) filter, according to an embodiment of the present invention;

FIG. 4 depicts an exemplary activity classification filter, according to an embodiment of the present invention;

DETAILED DESCRIPTION

The following description relates to a framework (system and method) for detecting and classifying moving and stationary objects of a certain class (e.g., people, vehicles) from a moving platform in the presence of strong parallax, such as in the case of a ground vehicle moving through an urban environment, herein referred to as an object detection system.

The object detection system uses input from sensors of different modalities (e.g., visible, image intensifier, thermal) with a common field of view. According to an embodiment of the present invention, a plurality of sensors of different modality can be combined to form a sensor set (e.g., a sensor set comprising a visible sensor, thermal sensor and image intensifier sensor). Multiple sensor sets may be distributed around a vehicle to provide 360 degrees situational awareness for the vehicle crew.

Figure 1:
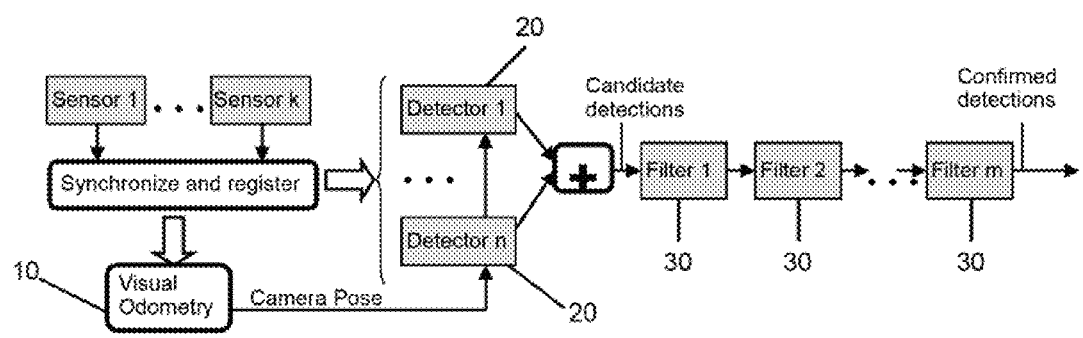
FIG. 1 depicts an exemplary object detection and filtering system and process flow in accordance with an embodiment of the present invention.

FIG. 1 illustrates an exemplary object detection system and process flow including one sensor set. Input data from different sensors (i.e., sensor 1 through sensor x) is aligned both spatially and temporally to produce a synchronized sequence, according to methods known by those having ordinary skill in the art. A visual odometry module 10 recovers the camera pose for every frame of the synchronized sequence, according to techniques known by those having ordinary skill in the art. According to an embodiment of the present invention, the visual odometry module 10 calculates the position and orientation of the moving platform The object detection system according to embodiments of the present invention may comprise any suitable number of detectors 20 (e.g., detector 1 through detector n in FIG. 1) and filters 30 (e.g., filter 1 through filter m in FIG. 1), a subset of them being "active" at any particular time.

According to an embodiment of the present invention, detectors 20 and filters 30 can be activated or deactivated based on several criteria. Typically, the "active" subset of detectors 20 and filters 30 is based on determinations made by the object detection system regarding environmental properties (e.g., distance to a target, latency requirements, speed of the target, speed of the mobile platform). It should be understood that the active subset of detectors 20 and filters 30 may consist of every detector 20 and every filter 30 included in the object detection system.

The active detectors 20 are applied to the input data and their responses are OR-ed together to form a set of "candidate detections". As used herein, the term "candidate detections" includes but is not limited to regions of interest in which a detector has potentially identified an object. The candidate detections are then passed through a series of active filters 30 of differing types (i.e., a filter of a first type, a filter of a second type) to reduce the number of false positives (i.e., produced when a detector 20 or filter 30 falsely identifies an object in a region of interest) and produce a set of "confirmed detections."

It should be understood that the filters 30 may either remove a candidate detection from a set of candidate detections, classify a candidate detection in a set of candidate detections (e.g., candidate detection comprises an object, candidate detection does not comprise an object, etc.), or both. A filter 30 can also be configured to classify an object. In this manner a filter 30 may be understood to be a classifier. Exemplary filter types are described in detail below. Each time a set of candidate detections is passed through a filter, a refined set of candidate detections is produced. After the set of candidate detections has been through the series of active filters, a final set of candidate detections is returned (i.e., a set of confirmed detections). The set of confirmed detections is a subset of a set of candidate detections that were not previously discarded by the filtering process. The set of confirmed detections is reported to the user through perceptible means.

According to an embodiment of the present invention, an exemplary detector 20 suitable for use in the object detection system is a moving target detector, known by those of ordinary skill in the art. An exemplary moving target detector may utilize the epipolar constraint method and shape consistency method, as described in United States Patent Application Publication No. 2007/0273696, which is hereby incorporated by reference herein.

According to an embodiment of the present invention, an exemplary detector 20 suitable for use in the object detection system is a slow moving and stationary targets detector, known by those having ordinary skill in the art. An exemplary slow moving and stationary targets detector suitable for use in connection with embodiments of the present invention is a 3D template detector that searches the scene ahead of each sensor (e.g., camera) for regions of depth that match a template that describes the expected size and shape of an object. Examples of slow moving and stationary targets detectors are described in U.S. Pat. Nos. 6,956,469 and 7,263,209, and United States Patent Application Publication No. 2008/0159620, which are hereby incorporated by reference herein.

According to an embodiment of the present invention, the object detection system can use either monocular or stereo input. Exemplary embodiments of the present invention may use range information recovered from motion stereo for the 3D template detector or use range recovered from stereo for the 3D template detector.

According to an embodiment of the present invention, the detectors 20 may be of different modality types (e.g., visible, image intensifier, thermal). For example, an IR hot-spot detector may be used for locating people or other objects capable of generating a heat signature.

Although FIG. 1 depicts the filters in series, it should be understood that the filters 30 may be operated in parallel, in series, or a combination of both.

Figure 6:
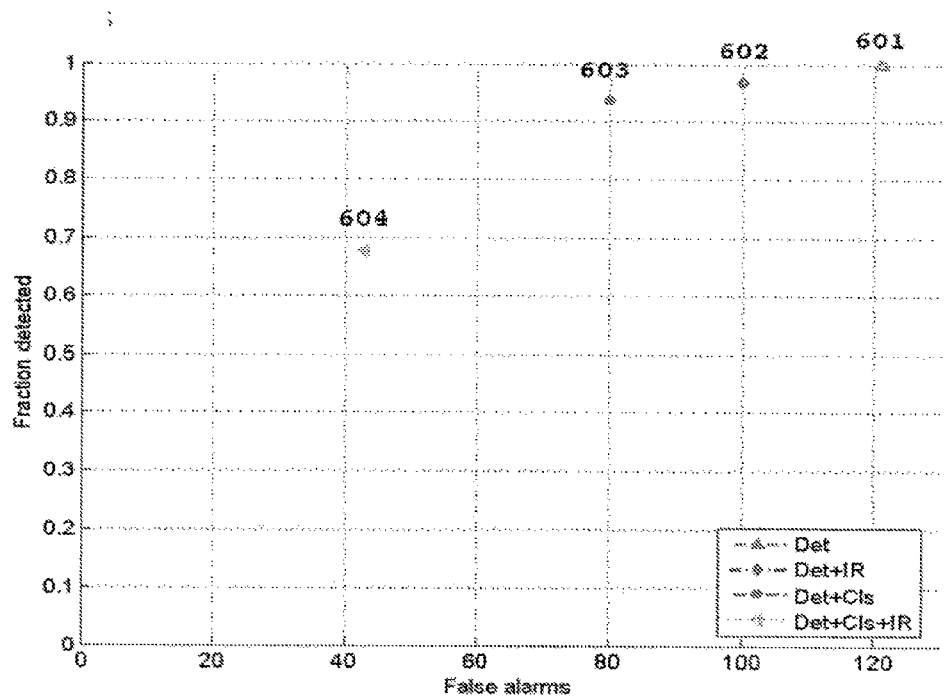
FIG. 6 depicts sample experimental results for different combinations of filters and filter types, according to an embodiment of the present invention.

FIG. 6 depicts exemplary results achieved by the methods and systems of the present invention. The graph shows the fraction of the targets that were detected (y axis), with "1" meaning that all targets were detected, versus the number of false positives generated for an entire test sequence (x axis). In this example, each test sequence was approximately 2 minutes long. Each point in FIG. 6 represents the output of a module (e.g., a detector, a detector and a infrared filter, a detector plus a infrared filter and a activity classification filter) in the processing pipeline. After the detection stage 601, all targets are detected, but with a large number of false positives (e.g., approximately 120). Applying an infrared filter 602 after the detection stage 601 reduces the number of false positives (e.g., approximately 100). Applying an exemplary filter 603 (i.e., "C1s" in the graph) will also result in the reduction of false positives (e.g., approximately 80). By applying multiple filters 604 (e.g., an IR based segmentation filter and a contour-based filter) the number of false positives is reduced further than either of the filters by themselves.

Furthermore, according to embodiments of the present invention, an object detection system can be implemented in a manner that is optimized for efficiency. For example, cheap to compute filtering methods may be utilized before sophisticated and computationally intensive filters in order to efficiently remove obvious false positives with the least amount of computing power. For example, a Long Wave Infrared (LWIR) filter may be utilized before using a classifier based on Contour matching and Histogram of Oriented Gradient (HOG) feature descriptor. Since the LWIR filter can reject obvious false positives with relatively low computing power, an exemplary system does not get bogged down in a target rich 3D environment.

According to embodiments of the present invention, a wide variety of filter types may be used in order to detect false positives in a set of candidate detections. Some of the exemplary filter types that may be utilized with the object detection system and methods of the present invention are described in further detail below.

Filter/Classifier Types

I. Infrared (IR) Based Segmentation and IR Classifier Filters

Figure 2:
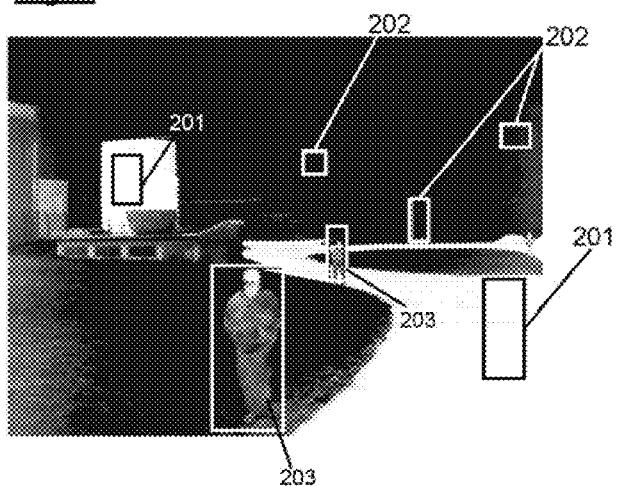
FIG. 2 depicts infrared pruning, according to an embodiment of the present invention.

According to an embodiment of the present invention, LWIR filters are used to classify candidate detections based on several statistical properties (e.g., mean, variance). FIG. 2 shows an example where 5 of the 7 candidate detections are rejected based on their mean and variance values. In FIG. 2, the boxes labeled 201 and 202 are rejected based on their mean and variance. The two boxes 203 are confirmed detections.

FIG. 3 depicts an exemplary method for a LWIR filter. First, the LWIR filter computes a derivative of LWIR data (i.e., thermal intensity) across image columns (i.e., accentuate vertical edges). Second, for each detection region (R), the LWIR filter computes a threshold (T) (i.e., a first threshold score) such that a percentage (e.g., 80%) of the derivative pixels within region (R) are below the threshold (T) (i.e., a set of pixels a with low thermal intensity derivative) and the remaining pixels (e.g., 20%) are above the threshold (T) (i.e., a set of pixels with a high thermal intensity derivative). Third, the LWIR filter binarizes the region (R) (i.e., changes each pixel in R to either black or white) using the threshold (T). Pixels with the highest thermal intensity derivative are chosen first, leaving the pixels with lower thermal intensity derivative to be below the threshold (T). For example, if the threshold (T) was such that 80% of the pixels are below the threshold (T) (i.e., the first set of pixels), only the 20% of the pixels with the highest thermal intensity derivative would be above the threshold (T) (i.e., the second set of pixels). In this example, 80% of pixels below the threshold (T) are binarized to black and the 20% of pixels with the highest thermal intensity derivative are binarized to white.

After the LWIR filter binarizes the pixels, a connected component analysis is performed. A connected component is a grouping of pixels that are above the threshold. The connected component analysis consists of identifying the number of connected components within the region (R). The LWIR filter then stores the number of connected components (N).

The LWIR filter then determines if the computed threshold (T) is less than a certain minimum level of thermal intensity derivative (L). If the computed threshold (T) is less than level (L), then region (R) is rejected as a false positive.

As an alternative to, or in combination with the previous step, the LWIR filter computes the area of pixels (A) and a number of connected components (N). If the number of connected components (N) divided by area (A) is greater than or equal to a second threshold (C), the candidate detection is identified as a false positive. For an example, take a candidate region comprising a pedestrian. After making the candidate region binary, only a few connected components would remain (e.g., a connected component representing the boundaries of the head, a connected component representing the boundaries of the torso, etc). However, if applied to a candidate region comprising a road surface, after making the candidate region binary, it is likely many small connected components would remain (e.g., different parts of the road surface that are of the highest thermal intensity derivative). Therefore, if a candidate region has a few large connected components (i.e., the pedestrian), it is likely to be an object of interest. Inversely, if the candidate region has several small connected components (i.e., the road surface), it is likely to be a false positive.

II. Consistency of Detection Over Multiple Frames Filters

A Consistency of Detection over Multiple Frames Filter is configured to associate instantaneous detections over time, and only those that persist for a certain number of frames are confirmed as being an object of interest. Since true targets are present in the field of view for longer periods of time and some of the false positives are due to spurious detections, the consistency filter reduces the number of false positives.

A Consistency of Detection over Multiple Frames Filter may be part of an active subset of filters based on an operating scenario. The number of frames over which the consistency is checked can be modified depending on the acceptable detection latency. For applications where a very low latency is required, the number of frames will be small, or the Consistency of Detection over Multiple Frames Filter can be deactivated. When the number of false alarms is more critical than the latency, the number of frames can be increased.

III. Implausible Depth, Size and 3D Constraints for Detected Object Filters

An Implausible Depth, Size and 3D Constraints for Detected Object Filter, the range to an object of interest is determined from motion stereo or from the target image location and the ground plane equation. Given the target image size, range to target and nominal size for an object, detections for which these measurements are inconsistent are eliminated.

IV. Scene Classification Filters

A Scene Classification Filter is configured to obtain 3D range information from motion-stereo detectors, and analyze the range information to extract local scene structures (e.g., vertical wall like regions, trees). Knowledge of the scene structure is then used to reject some of the candidate detections that overlap with the background.

V. Activity Classification Filters

An Activity Classification Filter can be used to confirm detections that contain objects performing some specific activity (e.g., a person walking, a person running, a bird flying). In this case the spatio-temporal volume for a particular target is analyzed to determine the type of activity it represents. The main challenges are the great variability due to change in viewing direction (same type of actions may look completely different) and the huge intra-class variations due to high spatial-temporal dimensionality. To address these challenges, the embedded perceptual distance to a number of typical action exemplars as the underlying representation rather than modeling the high dimensional action volume in space-time. Changes in viewing direction may be handled by having a number of exemplars for the same action, but from different viewpoints. The perceptual distance computation does not require subtraction of complex backgrounds.

FIG. 4 depicts an exemplary Activity Classification Filtering process, suitable for use in connection with embodiments of the present invention. The Activity Classification Filter might be part of an active subset of filters only for targets that are comprised of enough pixels to enable discrimination of a certain activity type.

VI. Contour+Histogram of Oriented Gradients-based Classifier Filters (C-HOG Filters)

A C-HOG Filter, according to an embodiment of the present invention, is configured to compute a two-dimensional spatial-orientation histogram where the weights in the histogram are weighted by their gradient magnitude. Furthermore, an exemplary C-HOG Filter utilizes a set of refined sampling windows as well as a Global Foreground Mask 530 calculated by a Contour Matching Filter, as described below, to further improve the efficacy of the C-HOG Filter.

According to an embodiment of the present invention, an exemplary Contour Matching Filter is described in detail herein. First, a Contour Vocabulary is constructed in an offline procedure by sampling binary contours from a database of object silhouettes. In the Contour Vocabulary matching step, first, an edge map and edge gradients are computed from a given candidate detection. Second, a local part contour set is matched to the extracted edge map by chamfer matching, which refines each local feature sampling window. Specifically, the chamfer score for each part template is computed in the local region and the associated sampling window is anchored at the position of the maximum chamfer score.

Figure 5:
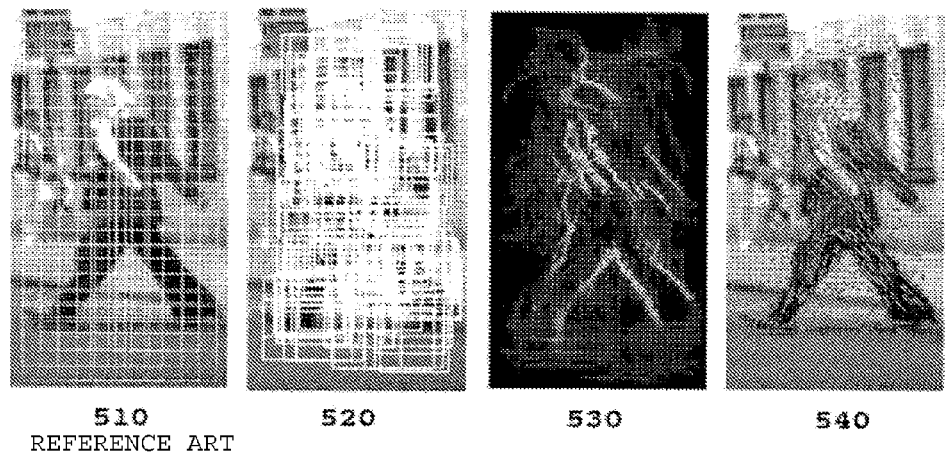
FIG. 5 depicts an exemplary contour-based filter, according to an embodiment of the present invention.

With reference to FIG. 5, image 510 shows how a typical prior art approach refines sampling window positions. In image 510, the sampling windows are rigid. The application of an exemplary Contour Matching Filter, according to embodiments of the present invention, to the same candidate region as shown in image 510 is illustrated in images 520, 540. In image 520, the Contour Matching Filter refines the sampling window positions on top of underlying parts of the object through the chamfer matching process described above.

Figure 9:
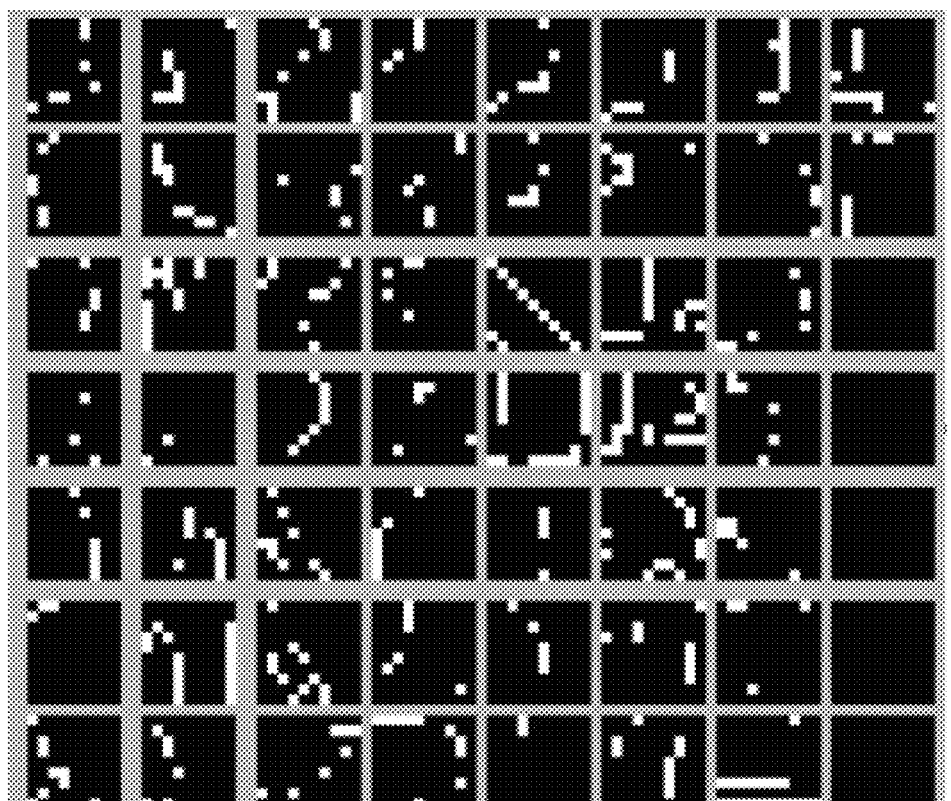
FIG. 9 depicts an exemplary set of matched local templates, according to an embodiment of the present invention.

According to an embodiment of the present invention, the Contour Matching Filter additionally creates a Global Foreground Mask 530 by overlapping the set of matched local templates, each of which is weighted by matching scores. In this manner, the Contour Matching Filter explicitly handles local feature alignment with body contour segments and suppresses background noise from foreground mask composition and filtering. The set of matched local templates represents a collection (e.g., a database) of stored contours frequently associated with a given object (e.g., the contours of a person's head, the contours of a vehicle's wheel, etc.). FIG. 9 depicts an exemplary set of matched local templates.

The Global Foreground Mask 530 can then be used in conjunction with an exemplary C-HOG Filter to provide better results due to the suppression of background noise. In accordance to embodiments of the present invention, a C-HOG Filter utilizes the set of refined sampling windows as well as the Global Foreground Mask 530 provided by the Contour Matching Filter, for object classification. The C-HOG utilizes the refined sampling feature window and the composed Global Foreground Mask 530 for computing HOG feature 530.

Figure 7:
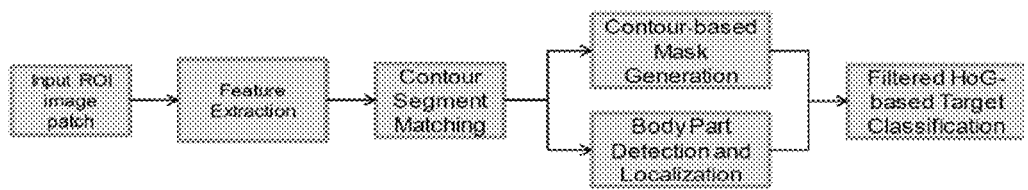
FIG. 7 depicts a filtering scheme using appearance information to determine whether a ROI belongs to a particular class, according to an embodiment of the present invention.

FIG. 7 depicts an exemplary C-HOG filtering scheme, in accordance with embodiments of the present invention, which applies a Contour Based Matching Filter in combination with a HOG classification to determine whether a candidate detection (ROI) belongs to a particular class. First, a candidate detection (ROI) is sent to a Contour-Based Matching Filter. Second, the Contour-Based Matching Filter extracts the features from the candidate detection and computes an edge map and edge gradients. Third, binary contours from the set of matched local templates are matched to the edge map. Fourth, the Contour-Based Matching Filter computes a set of sampling window localization information and a Global Foreground Mask 530, as described above. Finally, the Contour-Based Matching Filter transmits the set of sampling window localization information and the Global Foreground Mask 530 to a HOG classifier for further processing in which the area processed is the subset of the candidate region present in the overlapping sections of the Global Foreground Mask 530 and the set of refined sampling windows. Image 540 depicts a visual representation of the results of a combination of a Contour-Based Matching and a HOG classification that excluded a majority of background noise during the HOG feature computation process.

Figure 8:
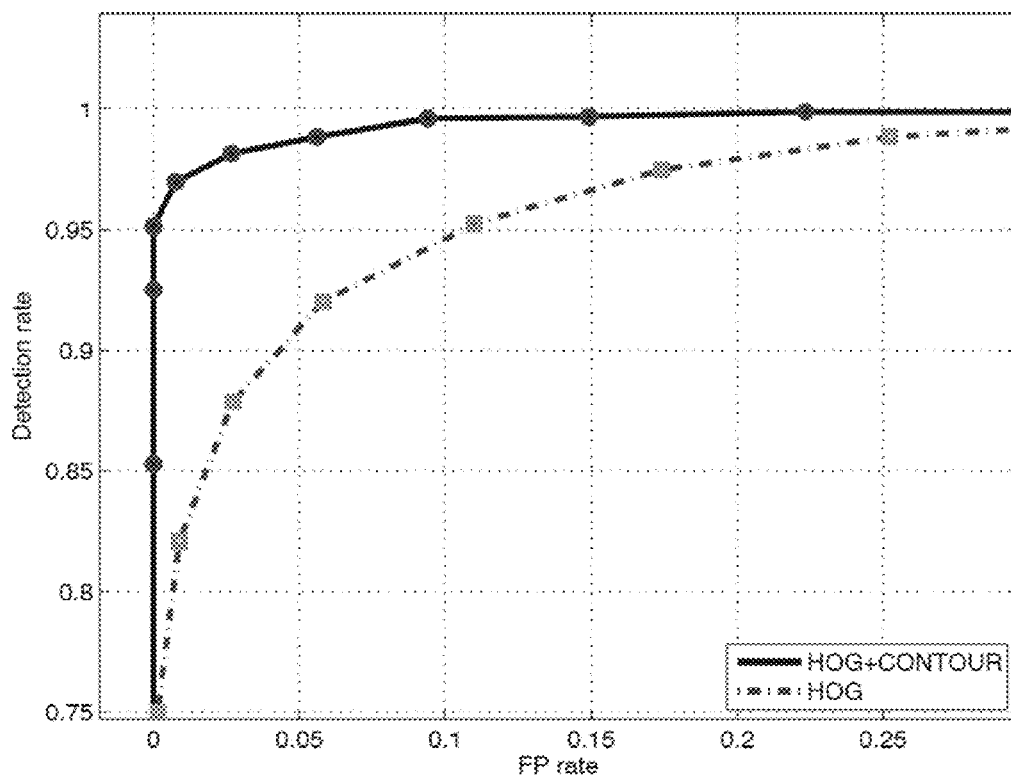
FIG. 8 depicts exemplary results achieved by a combination of a contour-based filter and a histogram of oriented gradients filter in accordance with exemplary methods and systems of the present invention.

FIG. 8 depicts exemplary results achieved by the previously described C-HOG Filter, in accordance with embodiments of the present invention. The graph shows the quantitative evaluation between typical HOG-based Filter and an exemplary C-HOG Filter by showing fractions of targets that were detected (y axis) in relation to the fraction of detections that were false positives (x axis). In FIG. 8, both Filters are trained and evaluated under the same condition of training set of 2000 positives and 4000 negatives and test on 4841 positives and 15494 negatives. The figure shows the distinctive advantage of the C-HOG Filter described herein, illustrating the improved detection rate and false positive rejection rate achieved according to embodiments of the present invention.

It is to be understood that the above-described embodiments are merely illustrative of the present invention and that many variations of the above-described embodiments can be devised by one skilled in the art without departing from the scope of the invention. It is therefore intended that such variations be included within the scope of the following claims and their equivalents.

The invention claimed is:

1. A method of identifying a false positive in a candidate detection, the method comprising the steps of:
    extracting binary contours of a potential object within the candidate detection to form an extracted edge map;
    matching a local part contour set to the extracted edge map;
    refining a set of sampling windows based on the matched local part contour set;
    composing a global foreground mask from the extracted edge map;
    computing gradient directions for a subset of the area of the candidate detection that correlates with the set of refined sampling windows and the global foreground mask; and
    determining, from the gradient directions, whether the candidate detection is a false positive.

2. A system for performing object detection comprising:
    a plurality of sensors with a common field of view, wherein frames captured by the plurality of sensors are spatially and temporally aligned to produce a synchronized sequence of frames;
    a plurality of detectors, each of the detectors being configured to identify a corresponding candidate detection as output, wherein an active subset of the plurality of detectors is selected based on at least one environmental property;
    wherein the outputs of the detectors in the active subset are logically OR-ed by a processor, to produce a set of candidate detections; and a plurality of filters configured to execute on the processor to identify false positives and produce a set of confirmed detections from the set of candidate detections, wherein an active subset of the plurality of filters is selected based on the at least one environmental property.

3. The system of claim 2, wherein at least one of the active subset of filters is a classifier.

4. The system of claim 3, wherein at least one of the active subset of filters is at least one of an infrared filter, a contour matching filter, a consistency of detection over multiple frames filter, an implausible depth, size, and 3D constraints for detected object filter, a scene classification filter, an activity classification filter, and a Contour and Histogram of Oriented Gradients-based classifier filter.

5. The system of claim 2, wherein the active subset of filters is ordered in parallel, in series, or a combination of both.

6. The system of claim 2, wherein a pose is recovered for each frame of the synchronized sequence of frames.

7. The system of claim 2, wherein at least two of the plurality of sensors are of different modalities.

8. The system of claim 2, wherein at least two of the plurality of filters are of different types.

9. The system of claim 2, wherein a modality for a corresponding one of the plurality of sensors is chosen from a list comprising visible, image intensifier, thermal, radar, and time-of-flight sensors.

10. The system of claim 2, wherein the at least one environmental property is at least one of distance to a target, latency requirements, speed of the target, and speed of a mobile platform upon which the system is mounted.

11. The system of claim 2, wherein at least one of the plurality of detectors is at least one of a moving target detector and a slow moving and stationary targets detector.

12. A method for performing object detection, comprising the steps of:
spatially and temporally aligning a plurality of frames captured by a plurality of sensors with a common field of view to produce a synchronized sequence of frames;
identifying candidate detection as output using an active subset of a plurality of detectors selected based on at least one environmental property;
logically OR-ing the output of the active subset of detectors to produce a set of candidate detections;
identifying false positives from the candidate detections using an active subset of a plurality of filters selected based on the at least one environmental property; and
combining an output of each of the active subset of the plurality of filters to produce a set of confirmed detections from the set of candidate detections, wherein an active subset of the plurality of filters is selected based on the at least one environmental property and, wherein the false positives are identified by composing a global foreground mask and computing gradient directions based on the global foreground mask.

13. The method of claim 12, wherein the active subset of the plurality of filters is ordered in parallel, in series, or a combination of both.

14. The method of claim 12, further comprising the step of recovering a pose for each frame of the synchronized sequence of frames using visual odometry.

15. The method of claim 12, wherein the at least one environmental property is at least one of distance to a target, latency requirements, speed of the target, and speed of a mobile platform upon which the plurality of sensors is mounted.

16. The method of claim 12, wherein the step of identifying false positives from the set of candidate detections further comprises the step of searching a scene for regions of depth that match a template describing an expected size and shape of an object.

17. The method of claim 12, wherein the step of identifying false positives from the set of candidate detections further comprises the steps of:
extracting binary contours of a potential object within a candidate detection from the set of candidate detections to form an extracted edge map;
matching a local part contour set to the extracted edge map;
refining a set of sampling windows based on the matched local part contour set;
composing a global foreground mask from the extracted edge map;
computing gradient directions for a subset of the area of the candidate detection that correlates with the set of refined sampling windows and the global foreground mask; and
determining, from the gradient directions, whether the candidate detection is a false positive.

18. The method of claim 12, wherein the step of identifying false positives from the set of candidate detections further comprises the steps of associating instantaneous detections over time, wherein only those candidate detections that persist for a predetermined number of frames are confirmed as being objects of interest.

19. The method of claim 12, wherein the step of identifying false positives from the set of candidate detections further comprises the steps of:
determining a range to a candidate detection from at least one of motion stereo and a target image location and ground plane equation;
receiving a candidate detection image size; and
identifying the candidate detection as a false-positive when the image size, range to the candidate detection, and nominal size of the candidate detection are inconsistent with each other.

20. The method of claim 12, wherein the step of identifying false positives from the set of candidate detections further comprises the step of confirming candidate detections based on the candidate detection performing a specific activity.

21. The method of claim 20, wherein the step of confirming candidate detections based on the candidate detection performing a specific activity further comprises the steps of:
analyzing a spatio-temporal volume for the candidate detection to determine a type of activity the candidate detection represents, and
selecting the embedded perceptual distance to a number of typical exemplars as the type of activity the candidate detection represents.

* * * * *